United States Patent
Williston et al.

(10) Patent No.: US 11,409,946 B2
(45) Date of Patent: Aug. 9, 2022

(54) SYSTEM AND METHOD FOR LINKING FINANCIAL MANAGEMENT ACCOUNTS TO SOURCE COMPLIANCE DOCUMENTATION

(71) Applicant: IMP Partners LLC, Boston, MA (US)

(72) Inventors: Bryon A. Williston, Boston, MA (US); Kevin MacIntosh, Boston, MA (US); Tyler Cusack, Boston, MA (US)

(73) Assignee: IMP PARTNERS LLC, Boston, MA (US)

( * ) Notice: Subject to any disclaimer, the term of this patent is extended or adjusted under 35 U.S.C. 154(b) by 228 days.

(21) Appl. No.: 16/831,802

(22) Filed: Mar. 27, 2020

(65) Prior Publication Data

US 2021/0303771 A1   Sep. 30, 2021

(51) Int. Cl.

| | |
|---|---|
| *G06F 3/048* | (2013.01) |
| *G06F 40/134* | (2020.01) |
| *G06Q 40/06* | (2012.01) |
| *G06Q 10/10* | (2012.01) |
| *G06F 16/93* | (2019.01) |
| *G06F 40/169* | (2020.01) |
| *G06F 40/143* | (2020.01) |
| *G06Q 50/18* | (2012.01) |
| *G06Q 50/26* | (2012.01) |

(52) U.S. Cl.
CPC .......... *G06F 40/134* (2020.01); *G06F 16/93* (2019.01); *G06F 40/143* (2020.01); *G06F 40/169* (2020.01); *G06Q 10/10* (2013.01); *G06Q 40/06* (2013.01); *G06Q 50/18* (2013.01); *G06Q 50/26* (2013.01)

(58) Field of Classification Search
CPC ...... G06F 40/134; G06F 16/93; G06F 40/169; G06F 40/143; G06Q 10/10; G06Q 50/18
See application file for complete search history.

(56) References Cited

U.S. PATENT DOCUMENTS

| | | | |
|---|---|---|---|
| 5,749,077 A | 5/1998 | Campbell | |
| 6,820,069 B1 | 11/2004 | Kogan et al. | |
| 7,117,432 B1 * | 10/2006 | Shanahan | G06F 40/143 |
| | | | 715/210 |

(Continued)

FOREIGN PATENT DOCUMENTS

| | | |
|---|---|---|
| EP | 0 990 215 | 2/2004 |
| WO | WO 98/59307 | 12/1998 |
| WO | WO 00/58900 | 10/2000 |

*Primary Examiner* — David Phantana-angkool
(74) *Attorney, Agent, or Firm* — LaMorte & Associates P.C

(57) ABSTRACT

A system and method for linking management requirements for financial instruments to source documents. The system generates a viewing interface for viewing managed accounts that contain various financial instruments. Source documents for the financial instruments are converted into a digital format, therein producing digitized documents. The digitized documents are stored in a searchable database. The digitized documents are analyzed to locate specific clauses within the digitized documents that create management requirements. The clauses are identified with unique numerical identifiers. The numerical identifiers are used to create hyperlinks for recalling said clauses from the database. The hyperlinks are added to the viewing interface wherein the hyperlinks can be used to recall and review the clauses directly.

17 Claims, 3 Drawing Sheets

(56) References Cited

U.S. PATENT DOCUMENTS

| | | | |
|---|---|---|---|
| 7,657,474 B1 | 2/2010 | Dybala et al. | |
| 7,873,560 B2 | 1/2011 | Reich et al. | |
| 9,886,436 B2* | 2/2018 | Ghatage | G06F 40/106 |
| 10,187,542 B1* | 1/2019 | Fielding | G06F 16/93 |
| 10,915,701 B2* | 2/2021 | Sodhani | G06F 40/284 |
| 11,003,862 B2* | 5/2021 | Aggarwal | G06K 9/00456 |
| 11,334,907 B1* | 5/2022 | Beeman | G06Q 30/0241 |
| 2002/0082979 A1 | 6/2002 | Sands et al. | |
| 2002/0083079 A1* | 6/2002 | Meier | G06F 16/93 |
| 2015/0310005 A1* | 10/2015 | Ryger | G06F 16/24578 |
| | | | 707/706 |
| 2016/0042053 A1* | 2/2016 | De Sousa Webber | G06F 16/35 |
| | | | 707/739 |
| 2017/0132866 A1* | 5/2017 | Kuklinski | G06K 9/626 |
| 2017/0286415 A1* | 10/2017 | Kumar | G06F 16/93 |
| 2018/0033147 A1* | 2/2018 | Becker | G06V 30/40 |
| 2018/0239507 A1* | 8/2018 | Bui | G06F 16/345 |
| 2019/0180098 A1* | 6/2019 | Carpenter | G06K 9/00483 |
| 2019/0258854 A1* | 8/2019 | Hosabettu | G06V 30/414 |
| 2020/0111023 A1* | 4/2020 | Pondicherry Murugappan | |
| | | | G06N 7/005 |
| 2020/0302016 A1* | 9/2020 | Aggarwal | G06F 16/93 |
| 2021/0303771 A1* | 9/2021 | Williston | G06Q 10/10 |
| 2022/0012830 A1* | 1/2022 | Zernik | G06Q 50/18 |

\* cited by examiner

SYSTEM AND METHOD FOR LINKING FINANCIAL MANAGEMENT ACCOUNTS TO SOURCE COMPLIANCE DOCUMENTATION

BACKGROUND OF THE INVENTION

1. Field of the Invention

In general, the present invention relates to annotation systems that are used to link derivative documentation to source documentation. More particularly, the present invention relates to systems and methods that link financial management accounts to source documentation to ensure financial accounts meet compliance requirements of various financial instruments under management.

2. Prior Art Disclosure

There are many financial management professions who manage the wealth of others. Financial management is a heavily regulated industry. The rules and regulations that must be followed not only come from governmental agencies but also arise from the various financial instruments being managed. Failure to adhere to any applicable rules or regulations can have large negative consequences for a financial manager and his/her company. Failure to comply with governmental regulations may be a criminal act. Failure to comply with even a minor rule can result in fines, disadvantageous tax consequences, bad publicity, and loss of clients. As a consequence, it is vital that a financial management professional be able to identify and comprehend all the rules and regulations governing a financial instrument before any actions are taken.

The federal and state regulations regarding different financial instruments are typically well known by financial managers. However, some managed accounts may contain financial instruments from different countries, where the rules are less well known. Furthermore, the rules for various financial instruments often vary between instruments. The rules that govern a particular financial instrument are created when the financial instrument is created. The rules typically include administrative rules, calculated rules and restriction rules. Administrative rules include rules for performing audits and rules regarding the reporting of gains and losses.

Calculated rules can relate to, for example, the size of an account's position in a particular asset. For instance, a financial instrument may have been created with a calculation rule that requires its holdings consist of between 5% and 10% of technology stocks. Thus, to enforce this rule, a calculation must be made for proposed trades to see if the resulting rebalancing will result in a portfolio that consists of 5% to 10% technology stocks.

Restriction rules do not relate to the size of an account's position in a particular asset, but, rather, to whether an account trade can be placed at all. For example, a restriction rule might prohibit foreign securities from be added to an account, or may prohibit buying bonds below a specified bond rating. Bond ratings change over time. As such, a financial instrument may have rules that change over time. The result is that a financial manager must check compliance with the restriction rules prior to any action and periodically, even if the financial manager is familiar with the financial instrument.

In the industry, a financial manager typically checks with a compliance officer or a compliance researcher before acting on any account. However, different rules are often tracked by different compartments within a management company. Governmental rules may be tracked by a legal department. The calculation rules may be tracked by a market analyst. Administrative rules and restriction rules may be tracked by administrative staff. Often, all the rules that govern a particular financial instrument are gathered into a single spreadsheet or similar document. However, a financial manager viewing a spreadsheet has no effective way to check the accuracy of the requirements reported on the spreadsheet or to check if the requirements on the spreadsheet have been accurately reported and updated. If the requirements of a particular financial instrument are audited, it often takes hours of work and requires the review of many different documents from different departments and/or sources. Those documents can be in different electronic formats and even in different languages. As such, it is highly labor intensive, time consuming and costly to perform a full compliance audit.

In the prior art, systems have been developed that are intended to automatically check if an action about to be performed on a financial instrument is compliant with various preprogrammed rules and regulations. Such systems are exemplified by U.S. Pat. No. 7,657,474 to Dybala, U.S. Patent Application Publication No. 2002/0082979 to Sands, and EP0990215 to Beale. All these systems check if an action meets preprogrammed compliance rules. However, these prior art systems do not show the original source of the compliance rules so that the rules themselves can be verified, updated and cross-checked for audit.

A need therefore exists for a system that can annotate a financial instrument so that all governmental, administrative, calculation and restriction rules can be efficiently recalled when needed. A need also exists for a system that enables a financial manager to recall the source documentation that gave rise to all governmental, administrative, calculation and restriction rules for the purposes of interpretation, verification and audit. These needs are met by the present invention as described and claimed below.

SUMMARY OF THE INVENTION

The present invention is a system and method for linking management requirements for financial instruments to source documents that gave rise to those management requirements. The system generates a viewing interface for viewing managed accounts that contain various financial instruments. The management requirements that govern the management of a financial instrument are written in one or more source documents, such as the prospectus for the financial instrument. The source documents are converted into a digital format, therein producing digitized documents. The digitized documents are stored in a searchable database. The digitized documents are analyzed to locate specific clauses within the digitized documents that create the management requirements.

The clauses are identified with unique numerical identifiers. The numerical identifiers are used to create hyperlinks for recalling said clauses from the database. The hyperlinks are added to the viewing interface. The hyperlinks can be used to recall and review the clauses directly, therein eliminating questions that may exist in interpreting the management requirements.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and method can be embodied in many ways, only one exemplary embodiment is illustrated. The exemplary embodiment is selected for the purposes of explanation and description and sets forth one of the best modes contemplated for the invention. The illustrated embodiment, however, is merely exemplary and should not be considered a limitation when interpreting the scope of the appended claims.

Figure 1:
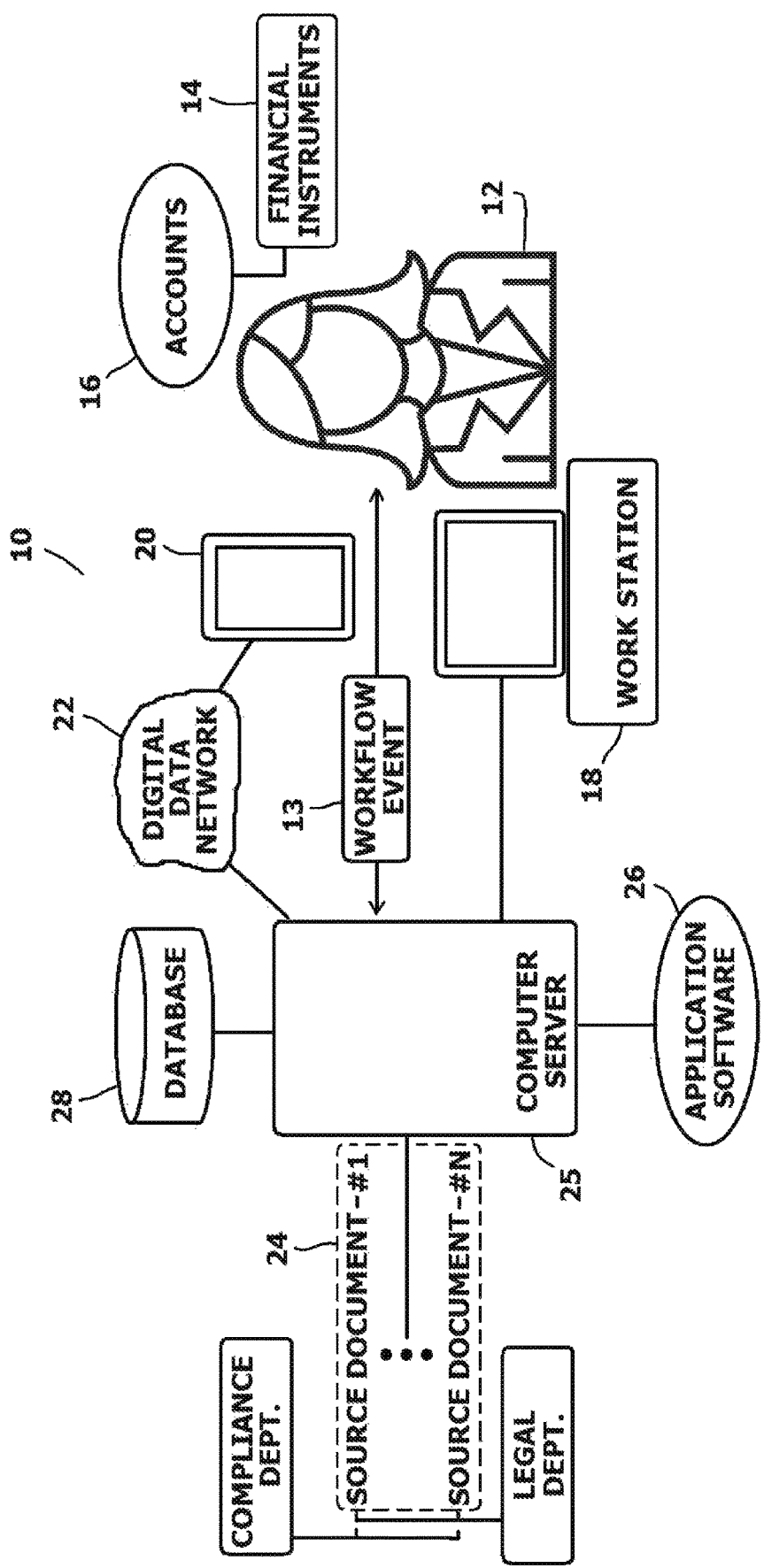
FIG. 1 is an overview of an exemplary embodiment of the present invention management system.

Referring to FIG. 1, an overview of the present invention management system 10 is explained. The system 10 is used by financial managers 12 and their employers to ensure that the financial managers 12 follow all governmental, administrative, calculation and restriction rules governing various financial instruments 14 being managed by the financial manager 12. The management system 10 also evaluates workflow events 13 to ensure compliance with all governmental, administrative, calculation and restriction rules. A workflow event 13 can be generated by the management system 10 to instruct a financial manager 12 to act in order to keep an account 16 in compliance. Alternatively, the workflow event 13 can be generated by the financial manager 12 when managing an account 16, wherein the management system 10 checks that the actions taken are within all compliance rules.

Each financial manager 12 is responsible for one or more accounts 16. Although a single financial manager 12 is shown, it will be understood that a financial management team can be substituted for the illustrated financial manager 12. Each managed account 16 contains one or more financial instruments 14. The financial instruments 14 are subject to various governmental, administrative, calculation and restriction rules. Compliance with these rules is streamlined using the management system 10. The financial manager 12 can access the management system 10 via a workstation 18. Alternatively, the financial manager 12 can link to the management system 10 from a remote computing device 20 via a digital data network 22.

The primary purpose of the management system 10 is to provide an interface that can link each financial instrument 14 in the different accounts 16 to the corresponding governmental, administrative, calculation and restriction rules that apply to that financial instrument 14. The financial instrument 14 is supplemented with hyperlinked annotations. The annotations link the requirements embodied within each financial instrument 14 to digitized versions of the source documents 24 that gave rise to the governmental, administrative, calculation and restriction requirements. In order to link a financial instrument 14 to digitized versions of the source documentation 24, a computer server 25 is utilized. The computer server 25 consists of one or more computer processors that run customized systems software 26. The computer server 25 maintains a database 28. The database 28 is used to store digitized versions of the source documentation 24. Within the database 28, digitized versions of all source documents 24 for the financial instruments 14 are maintained in a common digital format, so that the data can be efficiently stored, searched and recalled.

Governmental and trading exchange rules typically apply to all financial instruments of a particular type. The governmental and trading exchange rules are preferably input into the systems software 26 by a legal compliance team. If rules from foreign governments apply, the rules are provided in the native language of the financial manager 12. The systems software 26 links each financial instrument 14 in each account 16 to the appropriate governmental rule governing that financial instrument 14. For example, the federal, state and exchange rules for operating a mutual fund would be linked to each financial instrument 14 that is a mutual fund.

Most of the nuanced rules for a financial instrument 14 are contained in the calculation rules and restriction rules. These rules are specific to the wording used in the creation of the financial instrument 14. For instance, if a financial instrument 14 is a mutual fund, it will have a prospectus that outlines what can/cannot be owned and traded. Unfortunately, there is no standard format for prospectuses and the wording contained in prospectuses tends to vary depending upon whether the financial instrument 14 is a unit investment fund, an exchange traded fund, a hedge fund, a mutual fund or another financial instrument. Furthermore, institutional investors and corporate investors may have private rule requirements. For example, an institution may have a requirement not to own stock in a fossil fuel company. Such requirements often appear in the fine print of large financial management agreements. All the documents that contain calculation, restriction and/or administrative requirements are considered source documents 24. The source documents 24, if digital documents, are uploaded into the management system 10. If the source documents 24 are physical documents, they are scanned and uploaded into the management system 10 to produce corresponding digital documents.

Some source documents 24 are large documents that contain small print. Merely linking a source document 24 to a financial instrument 14 has limited value if it takes a long review and a trained eye to locate relevant clauses within that source document 24. As such, the source documents 24 are parsed and indexed to find and identify individual requirement clauses. The locations of these requirement clauses within the source documents 24 are then recorded. Once the locations of the individual requirement clauses are located, they can be hyperlinked to financial instruments 14 as annotations. In this manner, when a financial manager 12 is managing an account 16 and comes across a requirement, that manager 12 can link to the annotation. The relevant clauses of the original source document 24 can then be recalled by the financial manager 12 within seconds.

Figure 2:
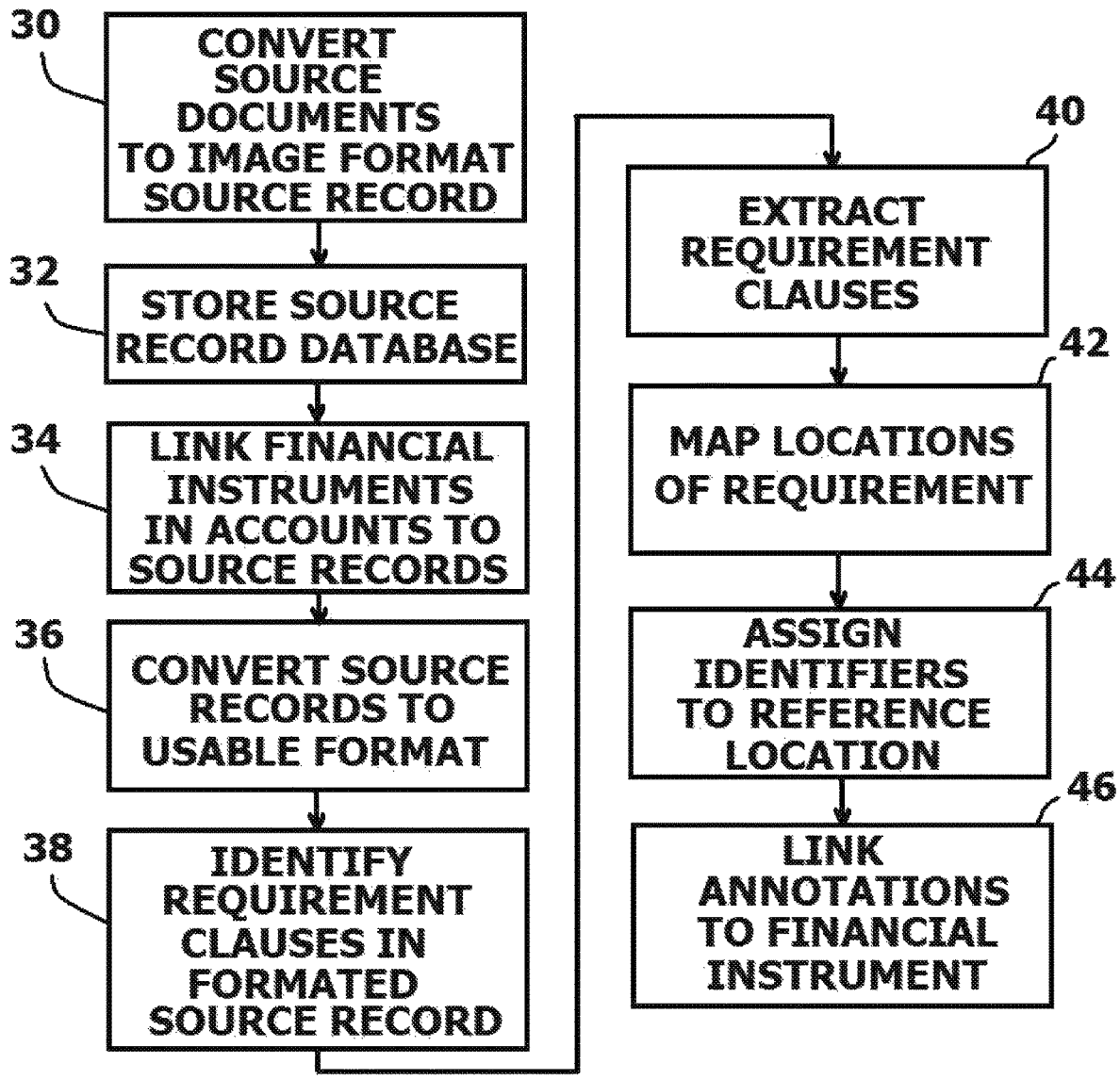
FIG. 2 is a block diagram outlining part of the methodology utilized by the management system of FIG. 1.

Referring to FIG. 2 in conjunction with FIG. 1, it can be seen that in order to enter a source document 24 into the management system 10, the source document 24 is scanned or digitally formatted into a digitized document. Each digitized document has a common image format, such as a portable digital format (PDF). See Block 30. The digitized versions of the source documents 24 are stored in the database 28 as source records. See Block 32. Each source record is for a specific financial instrument 14. As such, using the systems software 26, all accounts 16 that act upon the financial instrument 14 that is controlled by the source document 24 is linked to the source record in the database 28. See Block 34.

As is indicated by Block 36, the data contained in each source record is converted into a search friendly format, such as Hypertext Mark-up Language (HTML). Once in such a format, individual requirements are identified in e reformatted source record. See Block 38, This can be one manually by a person reading the source document 24. However, it is preferred that some form of automated text identification programing be used. Such text identification programming searches for words and phrases that are commonly associated with requirements, such as clauses that contain "shall", "shall not" "will" and "will not". The reformatted source record is searched for all investment management requirements, which include but are not limited to regulatory requirements, guidelines, and other mandates. The text search further classifies requirements as either an investment management compliance rule, an investment management workflow event that must be performed, or other "coverages" that are required to be performed, based on regulatory and contractual requirements. Once a requirement is identified, that requirement can be extracted and its physical location mapped in the digital version of the source document 24. See Block 40 and Block 42. Mapping for the physical locations of a requirement can be provided with line numbers and word numbers. However, it is preferred that location of clauses be identified with X-Y page coordinates that reference physical location on a given page. This provides more accurate mapping across documents that may have different layouts, fonts and other formatting.

Once a requirement is identified and its coordinates in a document determined, a 128-bit globally unique identified (GUID) number is assigned to the requirement as an annotation reference. See Block 44. The requirement is saved as a requirement record for a particular financial instrument 14 and the annotation reference is hyperlinked to that requirement record. See Block 46. This process is repeated for each requirement identified in the reformatted source document.

Figure 3:
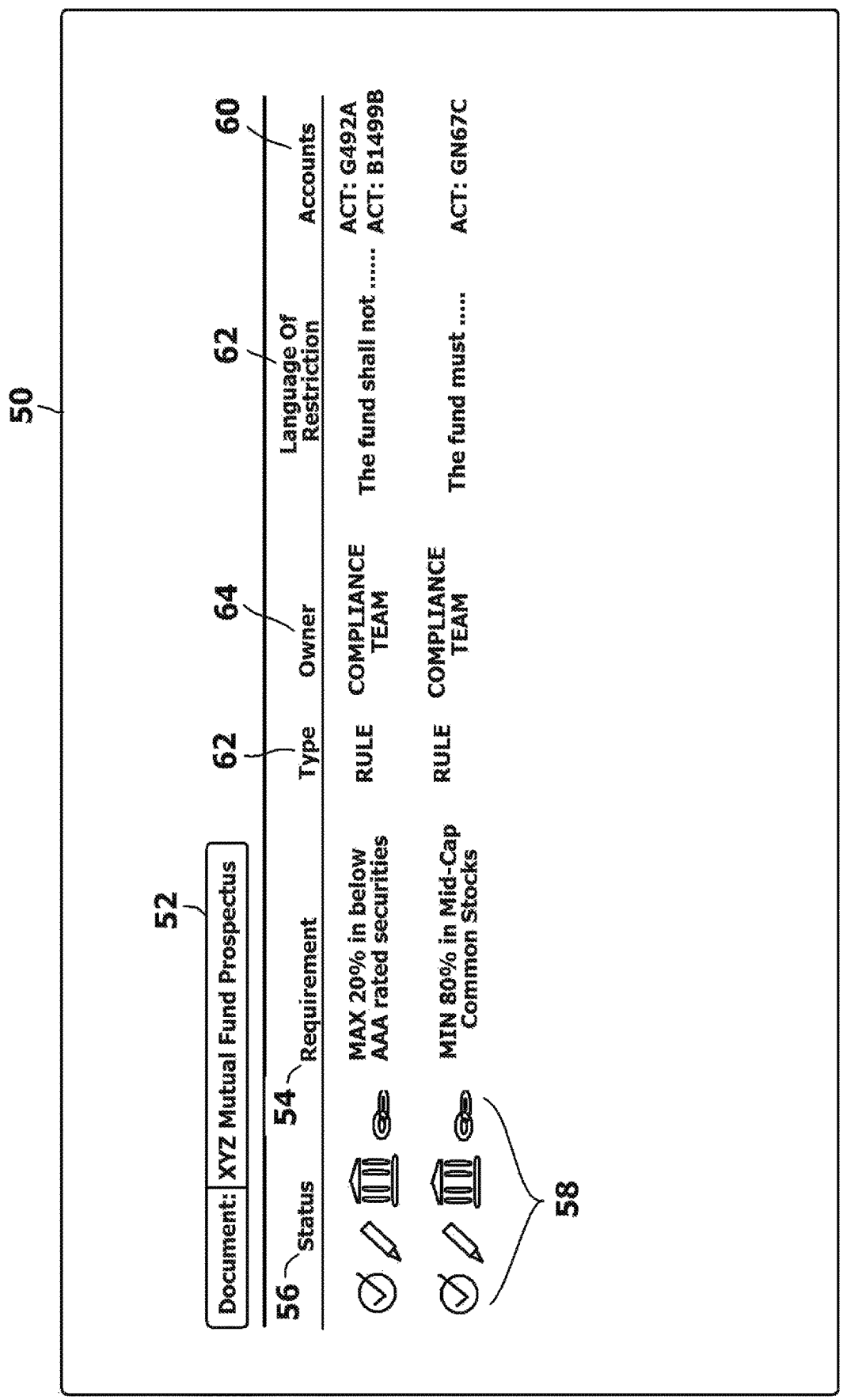
FIG. 3 is an exemplary embodiment of a viewing interface screen that is generated by the management system.

Referring to FIG. 3 in conjunction with FIG. 1, it will be understood that each financial instrument 14 in each account 16 may have many requirements associated with it. A financial manager 12 utilizes the management system 10 to generate various interface screens 50 that are used to manage an account 16 and see the requirements for that account 16. Likewise, a financial manager 12 can access a requirement from a source document 24 and see what accounts 16 are governed by that requirement.

In FIG. 3, an exemplary interface screen 50 is shown that is generated by the systems software 26 being run by the computer server 25. This exemplary interface screen 50 can be generated should a financial manager 12 elect to conduct a search by a source document 24. With reference to FIG. 3, it can be seen that the exemplary source document 24 being accessed is a prospectus for the "XYZ Mutual Fund". The selection of source document 24 is shown in a source document selection field 52. With the source document 24 selected, information is retrieved from the database 28 and displayed to the financial manager 12. The information is displayed on the interface screen 50 and is shown in a spreadsheet format. Many other formats can also be used. The spreadsheet format contains columns and rows of information that are hyperlinked to more detailed information. In the shown example, the spreadsheet of the exemplary interface screen 50 has a requirement column 54. The requirement column 54 lists synopses of various requirements contained within the retrieved source document 24 listed in the selection field 52. A particular source document can have dozens of requirements. In the shown exemplary embodiment, only two requirements are shown for the sake of simplicity.

A status column 56 is provided. The status column uses icons 58 to indicate the status of the different requirements. The icons 58 can indicate if the requirement is annotated and if the selected document is active. Icons 58 can also indicate that the selected source document 24 is linked to various accounts 16. The icons 58 can also indicate if there is any workflow event due for one of the accounts 16 linked to the selected source document 24.

The spreadsheet of the exemplary interface screen 50 has an account column 60 that indicates what accounts 16 contain financial instruments 14 that are subject to the selected source document 24. The financial manager 12 can click on any one of the listed accounts 16 to see all the requirements linked to each account 16. The spreadsheet of the exemplary interface screen 50 further has a requirement language column 60 that displays the exact clauses from the source document 24 that are used to generate the requirement. In this manner, nothing is lost in the synopses of the requirements shown in the requirement column 54.

Additional administrative columns 62, 64 can also be provided to indicate the type of requirement, that is, if the requirement is an instrument rule, law or trading exchange regulation. Likewise, the department or person assigned to updating and/or monitoring the requirement can likewise be listed.

From the above it will be understood that a financial manager 12 has the ability to review the relevant clauses of source documents 24 for any and all regulations associated with a financial instrument 14 under management. Likewise, a reverse ability exits that enables a financial manager 12 to find all accounts 16 with financial instruments 14 that stem from a particular source document 24. This ability enables the financial manager 12 to create highly accurate reports for all accounts 16 under management. The reports can be shareholder reports, audit reports or the like. The management system 10 enables reports to show each time a workflow event occurred for any account 16. The report can then show what action was taken in response to that workflow event and whether or not the account was in compliance with all laws, rules and regulation before and after the workflow event. The report has the further advantage of showing the exact wording of all requirements at the time of the workflow event. Consequently, there are no questions regarding compliance with requirements that may change over time due to changes in law, trading rules or other accepted industry standards. This provides a fully transparent and traceable audit history.

It will be understood that once the various financial instruments 14 in the different accounts 16 are annotated, and therefore linked to various source documents, the management system 10 can be used in different modes to perform different functions. For example, the described linking function can be used in reverse. In the description above, the financial instrument 14 is linked to source documents 24. However, using the system 10, a financial manager 12 can search a legal requirement to see what financial instruments 14 are effected. This can be used to create legal documents and to perform legal updates. When used in this manner, the management system 10 is not annotating, but is used to determine legal coverage. In this manner, lawyers can access the management system 10 to determine the effects of changes in the law and to determine compliance and risk.

The management system 10 can also be used to compare changes during an annual review process. Over time, new requirements may be implemented. Furthermore, additional clauses may be identified in source documents 24. Whenever the management system 10 is updated, the management system 10 can provide comparisons between the updated version and the prior version. Changes created by digital linking and updating can therefore be highlighted to the financial mangers 12 or anyone else in compliance and legal departments.

As additional source documents 24 and accounts 16 are added to the management system 10, the management system. 10 can analyze usage patterns to operate more efficiently. Such machine learning algorithms enable the management system 10 to determine where problems are occurring. For example, if different financial managers are reviewing the same rules, those rules can be reviewed to see if they are coded correctly, or if their coding is susceptible to trade errors or errors in interpretation.

It will be understood that the embodiment of the present invention that is illustrated and described is merely exemplary and that a person skilled in the art can make many variations to that embodiment. For instance, the layout of the interface screen can be varied in many ways. All such embodiments are intended to be included within the scope of the present invention as defined by the appended claims.

What is claimed is:

1. A method for linking management requirements for financial instruments to source documents that give rise to said management requirements, said method including:
   converting said source documents into a digital format, therein producing digitized documents that are stored in a database;
   analyzing said digitized documents to parse and locate requirement clauses within said digitized documents, wherein said management requirements are created by said requirement clauses;
   identifying said requirement clauses within said digitized documents with unique numerical identifiers;
   creating hyperlinks with said numerical identifiers that are used to create hyperlinks for recalling said requirement clauses from said digitized documents in said database;
   generating a viewing interface to view said management requirements for said financial instruments; and
   adding said hyperlinks to said viewing interface, wherein said hyperlinks can be used to recall and review said requirement clauses directly from said digitized documents while reviewing said financial instruments.

2. The method according to claim 1, further including mapping physical locations for said requirement clauses within said digitized documents, wherein said unique numerical identifiers identify said physical locations within said digitized documents.

3. The method according to claim 1, wherein converting said source documents into a digital format, includes converting all said source documents into a common portable digital format and storing all of said source documents in said database.

4. The method according to claim 3, wherein analyzing said digitized documents to locate requirement clauses includes converting said digitized documents in said portable digital format into a hypertext mark-up language and searching for said requirement clauses using text identification software.

5. The method according to claim 1, wherein said viewing interface includes a selection field for selecting one source document from said source documents.

6. The method according to claim 5, further including displaying information on all accounts under management that obtain at least one of said management requirements from said source document.

7. A method for linking management requirements derived from a prospectus of a financial instrument to wording in said prospectus, said method including:
   converting said prospectus into a digital format, therein producing a digitized prospectus;
   analyzing said digitized prospectus to locate requirement clauses within said digitized prospectus that create said management requirements;
   extracting said requirement clauses and saving said requirement clauses in a searchable database;
   identifying each of said requirement clauses with unique identifiers, wherein said unique identifiers are used to create hyperlinks for recalling said requirement clauses from said database;
   generating a viewing interface to view said management requirements; and
   adding said hyperlinks to said viewing interface, wherein said hyperlinks can be used to recall and review said clauses directly.

8. The method according to claim 7, further including saving all of said digitized prospectus in said database, wherein said digitized prospectus can be selective recalled for review.

9. The method according to claim 7, further including mapping physical locations for said clauses within said digitized prospectus, wherein said unique identifiers identify said physical locations within said digitized prospectus.

10. The method according to claim 7, wherein converting said prospectus into a digital format, includes converting said prospectus into a portable digital format.

11. The method according to claim 10, wherein analyzing said digitized prospectus to locate clauses includes converting said digitized prospectus in said portable digital format into a hypertext mark-up language and searching for said clauses using text identification software.

12. The method according to claim 7, further including displaying information on accounts under management that obtain at least one of said management requirements from said prospectus.

13. A method for verifying management requirements for a financial instrument that are contained in a source document, said method including:
   analyzing said source document to locate requirement clauses contained within said source document that create said management requirements;
   assigning unique identifiers to said requirement clauses;
   generating a viewing interface to view said management requirements;
   using said unique identifiers to create links to said requirement clauses that give rise to said management requirements, therein enabling said requirement clauses to be retrieved via said links and directly viewed on said viewing interface.

14. The method according to claim 13, further including storing said source documents in a database in a digital format.

15. The method according to claim 13, further including mapping physical locations for said clauses within said source documents, wherein said unique numerical identifiers identify said physical locations within said source documents.

16. The method according to claim 13, further including converting said source documents into a portable digital format and storing all of said source documents in a database.

17. The method according to claim 16, wherein analyzing said source documents to locate clauses includes converting said source documents in said portable digital format into hypertext mark-up language and searching for said clauses using text identification software.

\* \* \* \* \*